United States Patent
An et al.

(10) Patent No.: US 9,454,132 B2
(45) Date of Patent: Sep. 27, 2016

(54) INTEGRATED HOLOGRAM OPTICAL DEVICE

(71) Applicant: SAMSUNG ELECTRONICS CO., LTD., Suwon-si (KR)

(72) Inventors: Jung-kwuen An, Cheonan-si (KR); Kyoung-seok Pyun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 77 days.

(21) Appl. No.: 14/093,623

(22) Filed: Dec. 2, 2013

(65) Prior Publication Data

US 2014/0185115 A1    Jul. 3, 2014

(30) Foreign Application Priority Data

Dec. 27, 2012 (KR) ................. 10-2012-0155321

(51) Int. Cl.
| | | |
|---|---|---|
| G02B 17/00 | (2006.01) | |
| G02B 5/32 | (2006.01) | |
| G03H 1/26 | (2006.01) | |
| G03H 1/04 | (2006.01) | |
| G03H 1/30 | (2006.01) | |
| G03H 1/02 | (2006.01) | |

(52) U.S. Cl.
CPC .............. *G03H 1/26* (2013.01); *G02B 17/006* (2013.01); *G03H 1/0476* (2013.01); *G03H 1/30* (2013.01); *G02B 5/32* (2013.01); *G03H 1/0248* (2013.01); *G03H 2001/0482* (2013.01)

(58) Field of Classification Search
CPC .... G02B 5/09; G02B 5/1819; G02B 5/1823; G02B 5/1842; G02B 5/1861; G02B 5/32; G02B 17/002; G02B 19/0019; G02B 19/0023; G02B 27/0103; G02B 2027/0105; G02B 2027/0107; G02B 2027/0123; G02B 5/1866; G02B 5/1871; G02B 17/006; G02B 27/0944; G02B 2027/0125; G02B 2027/0174; G02B 2005/1804; G03H 1/0248; G03H 1/0476; G03H 1/26; G03H 1/30; G03H 2001/0482; G03H 2001/303; G03H 2001/306

See application file for complete search history.

(56) References Cited

U.S. PATENT DOCUMENTS

| | | | |
|---|---|---|---|
| 3,586,412 A * | 6/1971 | Leith ........................... 359/19 |
| 4,392,709 A | 7/1983 | Horner et al. |
| 5,615,022 A | 3/1997 | Brandstetter et al. |
| 6,960,773 B2 | 11/2005 | Menon et al. |
| 7,839,549 B2 | 11/2010 | Mihajlovic |
| 2004/0183938 A1 | 9/2004 | Campbell |
| 2005/0047314 A1* | 3/2005 | Abe ................. G11B 7/1353 369/112.15 |
| 2007/0216979 A1 | 9/2007 | Li et al. |
| 2009/0128873 A1 | 5/2009 | Lopes et al. |

OTHER PUBLICATIONS

Prongue et al., "Total internal reflection holography for optical interconnections," Optical Engineering, vol. 33, No. 2, Feb. 1994, pp. 636-642.*

Takahashi et al., "Wide-viewing-angle three-dimensional display system using HOE lens array," SPIE-IS&T, vol. 6055, 2006, pp. 60551C-1 through 60551C-9.*

* cited by examiner

*Primary Examiner* — Derek S Chapel
*Assistant Examiner* — Adam W Booher
(74) *Attorney, Agent, or Firm* — Sughrue Mion, PLLC

(57) ABSTRACT

An integrated hologram optical device, a method of manufacturing the same, and an integrated hologram recording apparatus are provided. The integrated hologram optical device includes a two-dimensional (2D) array of a plurality of hogels. A holographic element is configured to be recorded such that a combination of the plurality of hogels is configured to adjust at least one of an angle and a focal length of a signal beam.

14 Claims, 12 Drawing Sheets

INTEGRATED HOLOGRAM OPTICAL DEVICE

CROSS-REFERENCE TO RELATED APPLICATIONS

This application claims priority from Korean Patent Application No. 10-2012-0155321, filed on Dec. 27, 2012, in the Korean Intellectual Property Office, the disclosure of which is incorporated herein in its entirety by reference.

BACKGROUND

1. Field

Apparatuses, devices, and methods consistent with exemplary embodiments relate to integrated hologram optical devices, and more particularly, to a hogel-based integrated hologram optical device.

2. Description of the Related Art

A general optical element is formed of concave and convex glass, or a combination of several elements having concave and convex shapes. On the other hand, a holographic optical element is formed of one thin hologram recording medium having a flat surface shape, and thus may be integrated in a small space.

Generally, in order to manufacture a holographic optical element, a life-sized model of an optical element needs to be first manufactured. The holographic optical element having the same function as an optical lens constituting a model of a manufactured optical element may be manufactured by placing the manufactured optical element at a location of a signal beam, and placing a hologram recording medium to be recorded on, at a location where an interference pattern is generated by crossing a reference beam. However, it is difficult to overcome design limitations of an optical element constituting the model of a manufactured optical element when a holographic optical element is manufactured in such a manner.

SUMMARY

One or more exemplary embodiments provide a hogel-based integrated hologram optical device, a hogel-based integrated hologram recording apparatus, and a method of manufacturing a hogel-based integrated hologram optical device, which may not be limited by design limitations of an optical element used for holographic recording.

According to an aspect of an exemplary embodiment, there is provided an integrated hologram optical device including a two-dimensional (2D) array of a plurality of hogels, wherein a holographic element is configured to be recorded on each of the plurality of hogels such that a combination of the plurality of hogels is configured to adjust at least one of an angle and a focal length of a signal beam.

Each of the plurality of hogels may include an optical element.

A lattice plane of the optical element of each of the plurality of hogels may be formed to have an angle larger than 45° with respect to an incident surface of the integrated hologram optical device.

The optical element of each of the plurality of hogels may be configured such that the integrated hologram optical device operates as a lens, such that a parallel light vertically incident on the incident surface is reflected at an angle larger than 45°.

The lattice plane of the optical element of each of the plurality of hogels may form an angle with respect to a central axis of the integrated hologram optical device, wherein the angle may increase outwardly from the central axis such that the optical element of each of the plurality of hogels farther from the central axis form angles larger than the angles of the optical elements of the plurality of hogels closer to the central axis, and a reflective surface of the lattice plane of each of the optical elements faces the central axis.

The lattice plane of the optical element of each of the plurality of hogels may form an angle with respect to a central axis of the integrated hologram optical device, wherein the angle may increase outwardly from the central axis such that the optical element of each of the plurality of hogels farther from the central axis form angles larger than the angles of the optical elements of the plurality of hogels closer to the central axis, and a reflective surface of the lattice plane of each of the optical elements faces away from the central axis.

The optical element of each of the plurality of hogels may be prepared such that the combination of the plurality of hogels operates as an off-axis focusing lens.

A plurality of layers may include each of the plurality of layers including the 2D array of the plurality of hogels, and the 2D array of the plurality of hogels included in each of the plurality of the layers may be configured to operate as a focusing lens with respect to a light having a predetermined wavelength so as to operate as a chromatic aberration-free lens.

The optical element of each of the plurality of hogels may be configured such that the combination of the plurality of hogels operates as a transmission grating.

A lattice plane of the optical element of each of the plurality of hogels may have an angle smaller than 45° with respect to an incident surface of the integrated hologram optical device.

The optical element of each of the plurality of hogels may be configured such that the integrated hologram optical device operates as a curved mirror, such that parallel light vertically incident on the incident surface is reflected at the integrated hologram optical device at an angle smaller than 45°.

The lattice plane of the optical element of each of the plurality of hogels may form an angle with respect to a central axis of the integrated hologram optical device, wherein the angle may decrease outwardly from the central axis such that the optical element of each of the plurality of hogels farther from the central axis form angles smaller than the angles of the optical elements of the plurality of hogels closer to the central axis, and a reflective surface of the lattice plane of each of the optical elements faces the central axis.

The lattice plane of the optical element of each of the plurality of hogels may form an angle with respect to a central axis of the integrated hologram optical device, wherein the angle may decrease outwardly from the central axis such that the optical element of each of the plurality of hogels farther from the central axis form angles smaller than the angles of the optical elements of the plurality of hogels closer to the central axis, and a reflective surface of the lattice plane of each of the optical elements faces away from the central axis.

The optical element of each of the plurality of hogels may be configured such that the combination of the plurality of hogels operates as an off-axis curved mirror.

The optical element of each of the plurality of hogels may be configured such that the combination of the plurality of hogels operates as a reflection grating.

According to an aspect of another exemplary embodiment, there is provided an integrated hologram recording apparatus including: a stage, on which a hologram recording medium is disposed, wherein the stage is configured for supporting movement in x-directions and y-directions and angular-rotation of the hologram recording medium so as to form a 2D array of a plurality of hogels, wherein a combination of the plurality of hogels are configured to operate as an optical element, as a holographic element is recorded on the hologram recording medium in a hogel unit; a reference beam irradiator configured irradiate a reference beam on the hologram recording medium; and a signal beam irradiator configured to irradiate a signal beam to cross the irradiated reference beam on the hologram recording medium, adjust a focal length of the irradiated signal beam, and adjust a curvature of the irradiated signal beam, wherein each of the plurality of hogels is recorded on the hologram recording medium such that the combination of the plurality of hogels operates by adjusting an angle or the focal length of the irradiated signal beam.

The reference beam irradiator and the signal beam irradiator may respectively irradiate the reference beam and the signal beam so that the irradiated reference beam and the irradiated signal beam are both incident on a same surface of the hologram recording medium to generate an interference pattern.

The reference beam irradiator and the signal beam irradiator may respectively irradiate the reference beam and the signal beam so that the irradiated reference beam and the irradiated signal beam are incident on opposite surfaces on the hologram recording medium to generate an interference pattern.

The irradiated reference beam may be a collimated parallel beam.

The integrated hologram recording apparatus may form the integrated hologram optical device by forming the 2D array of the plurality of hogels on the hologram recording medium.

According to an aspect of another exemplary embodiment, there is provided a method of manufacturing an integrated hologram optical device, the method including: irradiating a reference beam onto a hologram recording medium placed on a stage; and forming a 2D array of a plurality of hogels, wherein a combination of the plurality of hogels operate as an optical element in response to irradiating a signal beam so that the irradiated signal beam and the irradiated reference beam cross each other to record a holographic element on the hologram recording medium in at least one hogel unit of the plurality of hogels, and wherein the irradiated signal beam and the irradiated reference beam cross each other as a result of moving and angular-rotation of the stage in x-directions and y-directions while adjusting a focal length and curvature of the irradiated signal beam.

The irradiated reference beam and the irradiated signal beam may both be incident on a same surface of the hologram recording medium to record a transmission integrated hologram.

The irradiated reference beam and the irradiated signal beam may both be incident on opposite surfaces on the hologram recording medium to record a reflection integrated hologram.

The irradiated reference beam may be a collimated parallel beam.

Additional aspects will be set forth in part in the description which follows and, in part, will be apparent from the description, or may be learned by practice of the exemplary embodiments.

BRIEF DESCRIPTION OF THE DRAWINGS

These and other aspects will become apparent and more readily appreciated from the following description of exemplary embodiments, taken in conjunction with the accompanying drawings in which.

DETAILED DESCRIPTION OF EXEMPLARY EMBODIMENTS

Figure 1:
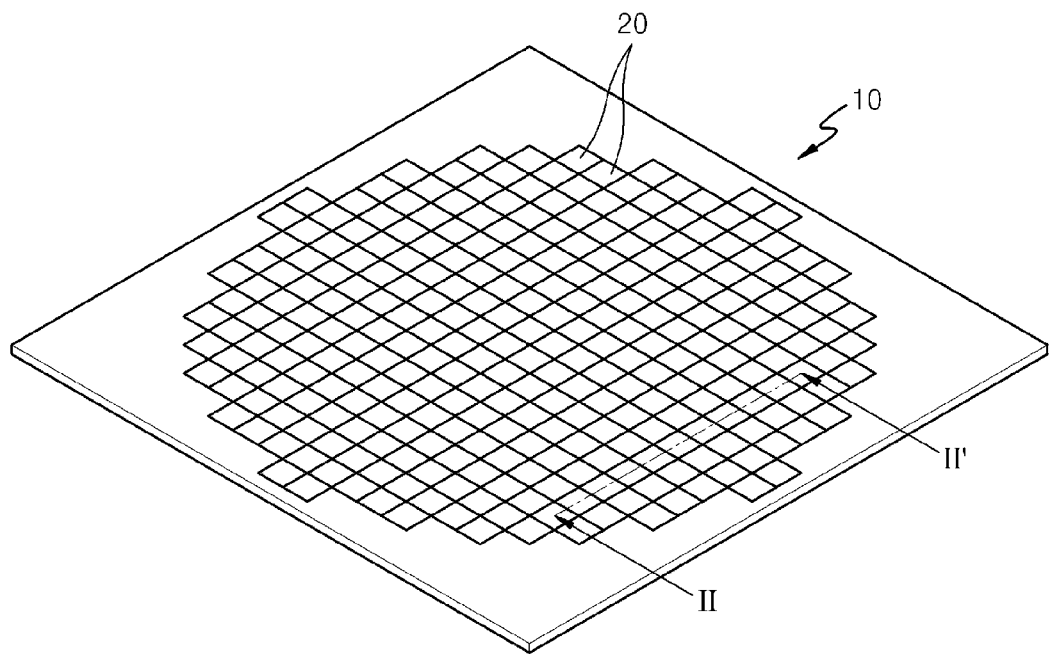
FIG. 1 is a schematic diagram illustrating an integrated hologram optical device according to an exemplary embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. The scope is defined not by the detailed description but by the appended claims. Like numerals denote like elements throughout.

Although the terms used herein are generic terms which are currently widely used and are selected by taking into consideration functions thereof, the meanings of the terms may vary according to the intentions of persons skilled in the art, legal precedents, or the emergence of new technologies. Furthermore, some specific terms may be randomly selected by the applicant, in which case the meanings of the terms may be specifically defined in the description of the exemplary embodiment. Thus, the terms should be defined not by simple appellations thereof but based on the meanings thereof and the context of the description of the exemplary embodiment. As used herein, expressions such as "at least one of," when preceding a list of elements, modify the entire list of elements and do not modify the individual elements of the list.

It will be understood that when the terms "includes," "comprises," "including," and/or "comprising," when used in this specification, specify the presence of stated elements and/or components, but do not preclude the presence or addition of one or more elements and/or components thereof.

An integrated hologram optical device according to an exemplary embodiment is prepared such that an entire holographic element is recorded by dividing and integrating the entire holographic element in a hogel unit as basic unit smaller than the entire holographic element. Here, a holographic element formed in each hogel may be recorded as an optical element, particularly, as a volume hologram type diffraction optical element (DOE), so that the entire holographic element of the integrated hologram optical device operates as an optical element.

Figure 2:
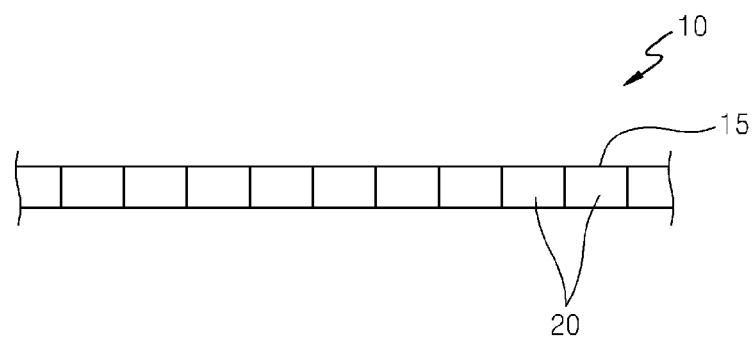
FIG. 2 is a schematic cross-sectional diagram illustrating the integrated hologram optical device of FIG. 1.

FIG. 1 is a schematic diagram illustrating an integrated hologram optical device 10 according to an exemplary embodiment, and FIG. 2 illustrates a schematic cross-sectional diagram of the integrated hologram optical device 10 of FIG. 1.

Referring to FIGS. 1 and 2, the integrated hologram optical device 10, according to the current exemplary embodiment, includes a two-dimensional (2D) array made up of a plurality of hogels 20 which constitutes an integrated hogel-based holographic element (IHOE). A holographic element may be recorded using a holographic volume grating method on each hogel 20 so that the combination of the hogels 20 may operate as a predetermined optical element by adjusting an angle or focal length of a signal beam. For example, the holographic element may be recorded using the holographic volume grating method such that each hogel 20 includes a DOE structure.

Figure 3:
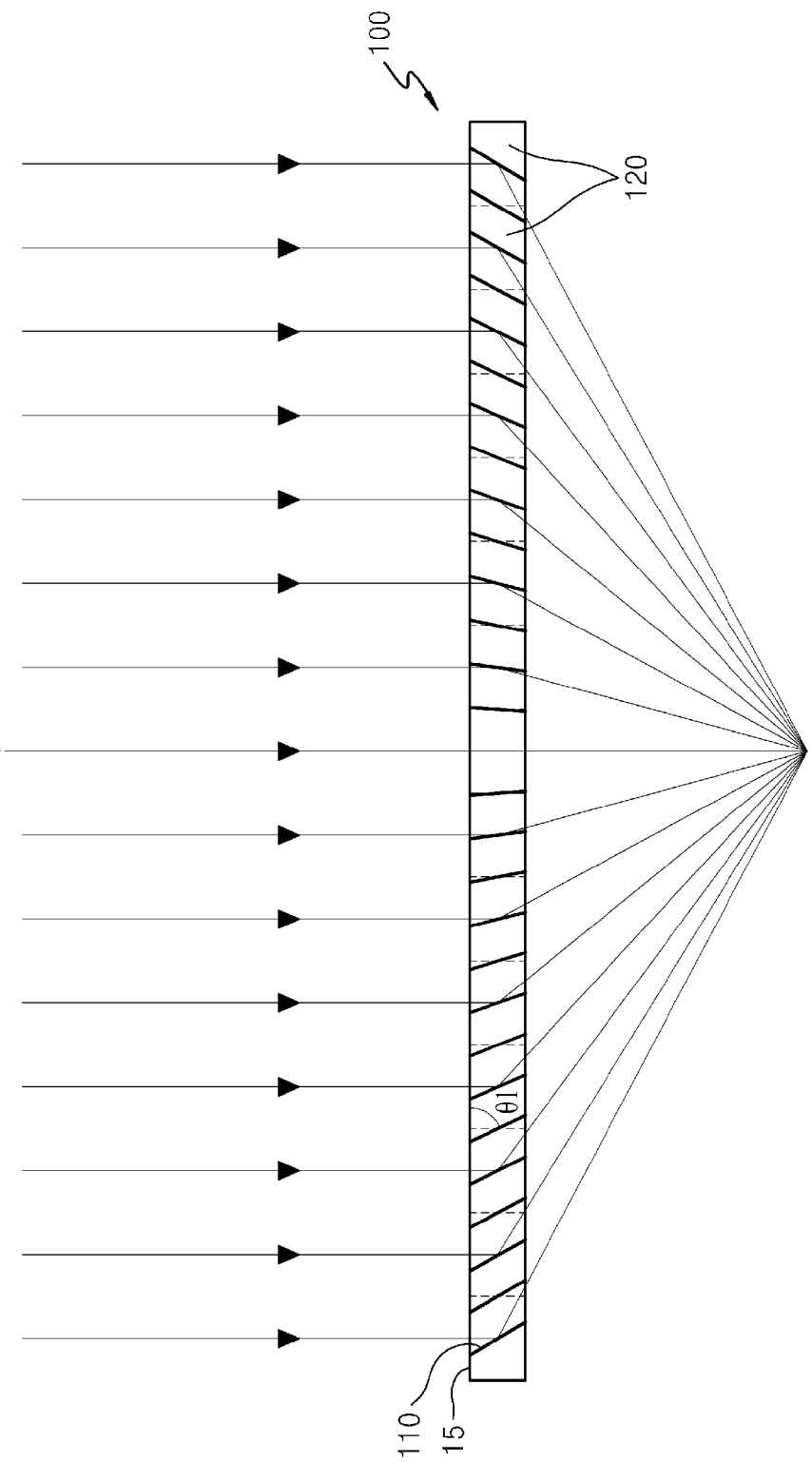
FIGS. 3 through 11 are schematic diagrams illustrating integrated hologram optical devices according to one or more exemplary embodiments.

According to one or more exemplary embodiments, a lattice plane of a DOE of each hogel 20 may have an angle (for example, θ1 in FIG. 3) larger than 45° with an incidence plane which is also known as an incident surface 15, as shown in integrated hologram optical devices 100, 200, 500, 700, and 800 of FIGS. 3, 4, 7, 9, and 10. In this case, because a parallel light vertically incident on the incidence plane/incident surface 15 is incident on the lattice plane of a DOE of each hogel 20 in an incidence angle larger than 45°, the DOE of each hogel 20 reflects the parallel light vertically incident on the incidence plane 15 in a reflection angle larger than 45°, and the integrated hologram optical device 10 may operate as a transmission integrated hologram optical device like the integrated hologram optical devices 100, 200, 500, 700, and 800. Light is vertically incident when the light is incident at an angle normal to an incident surface. A light incident on such a transmission integrated hologram optical device 10 is diffracted by a holographic volume grating recorded on the hogel 20 during passing through the hogel 20. For example, as shown in FIG. 3, when the integrated hologram optical device 100 is configured to operate as a hogel-based hologram lens, lights diffracted by hogels 120 may be gathered so that an entire incidence light is focused on one point.

Figure 5:
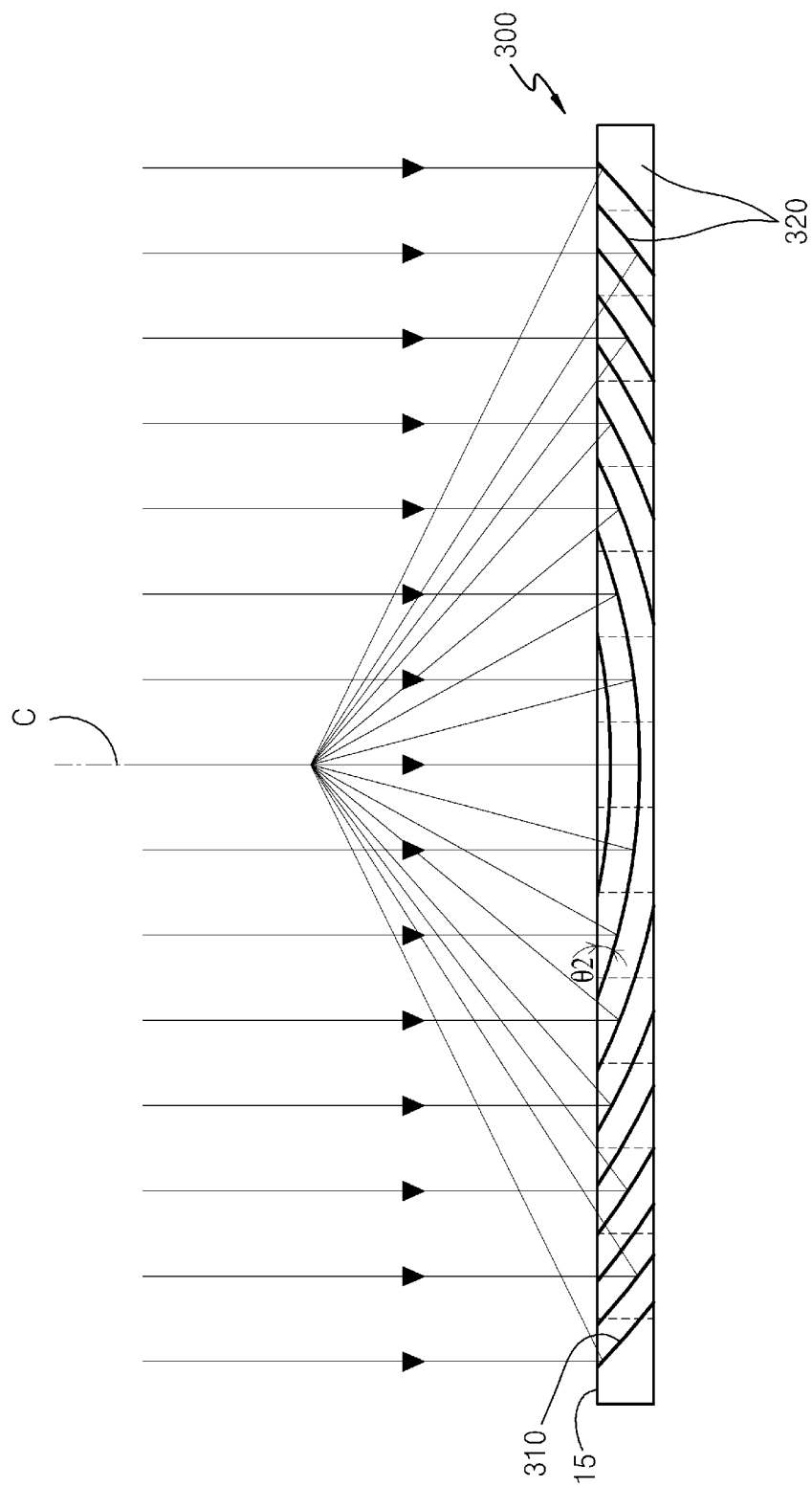

Alternatively, according to one or more other exemplary embodiments, the lattice plane of the DOE of the hogel 20 may have an angle (for example, θ2 in FIG. 5) smaller than 45° with the incidence plane 15, as shown in integrated hologram optical devices 300, 400, 600, and 900 of FIGS. 5, 6, 8, and 11. In this case, because the parallel light vertically incident on the incidence plane 15 is incident on the lattice plane of the DOE of each hogel 20 at an incidence angle smaller than 45°, the DOE of each hogel 20 reflects the parallel light at a reflection angle smaller than 45°, and the integrated hologram optical device 10 may operate as a reflection integrated hologram optical device like the integrated hologram optical devices 300, 400, 600, and 900. A light incident on such a reflection integrated hologram optical device 10 is diffracted by the holographic volume grating recorded on the hogel 20 when passing through the hogel 20. For example, as shown in FIG. 5, when the integrated hologram optical device 300 is configured such that a hogel-based hologram operates as a curved mirror, lights diffracted by hogels 320 may be gathered so that an entire incidence light is focused on one point.

FIGS. 3 through 11 are schematic diagrams of integrated hologram optical devices 100 through 900 according to various exemplary embodiments.

The integrated hologram optical device 100 of FIG. 3 operates as a focusing lens.

Referring to FIG. 3, the integrated hologram optical device 100 includes a 2D array of a plurality of the hogels 120, and may operate as a focusing lens of a positive focus, wherein a lattice plane 110 of a DOE of each hogel 120 reflects, at a reflection angle larger than 45°, a parallel light vertically incident on the incidence plane 15 so that the parallel light passes through the integrated hologram optical device 100, while a combination of the hogels 120 focuses the parallel light. In other words, the lattice plane 110 of the DOE of each hogel 120 may have an angle with respect to a central axis C, wherein the angle increases outwardly from the central axis C, and is configured to face the central axis C. Accordingly, the parallel light vertically incident on the incidence plane 15 may be focused on one point because the incidence angle and the reflection angle of the parallel light outwardly increase.

Figure 4:
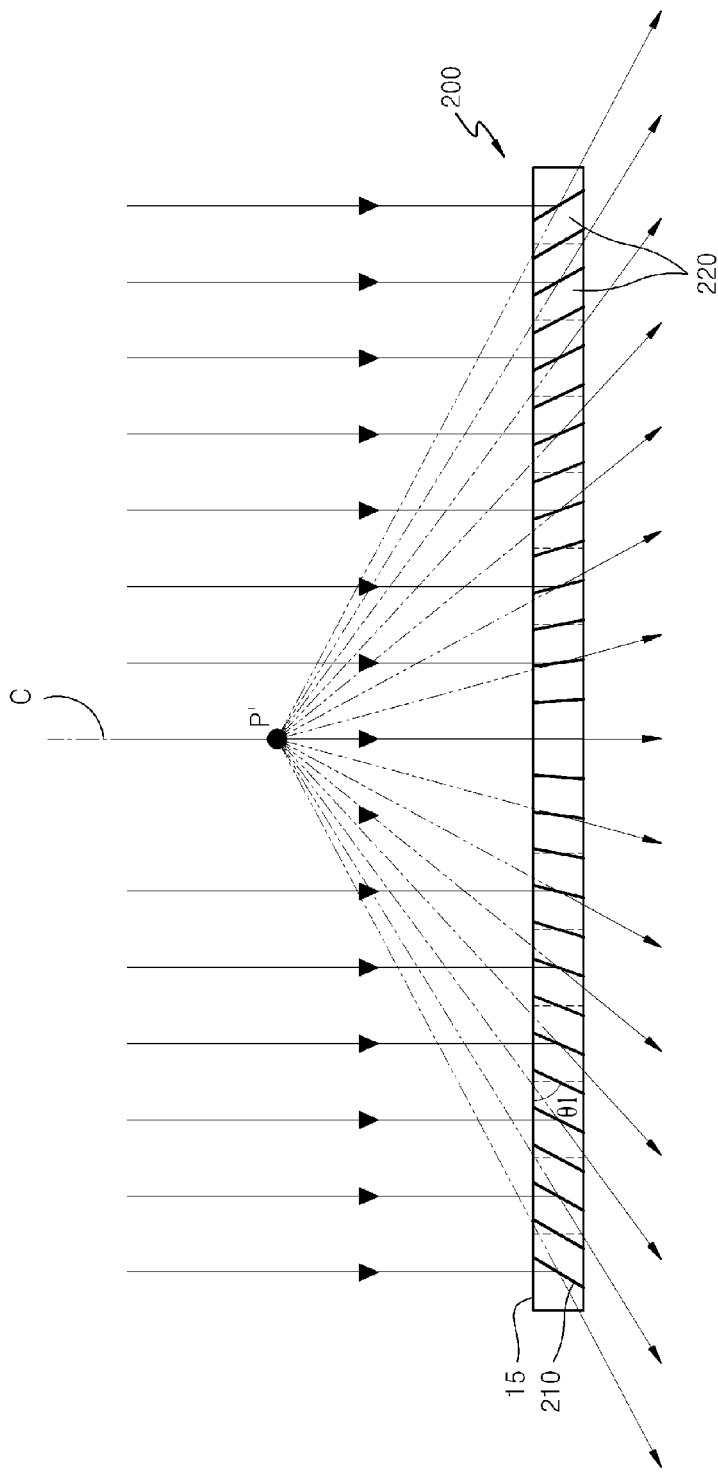

The integrated hologram optical device 200 of FIG. 4 operates as a diverging lens.

Referring to FIG. 4, the integrated hologram optical device 200 includes a 2D array of a plurality of hogels 220, and may operate as a diverging lens with a negative focus. The focal point of the negative focus is shown as P' in the figure. Particularly, a lattice plane 210 of a DOE of each hogel 220 reflects, at a reflection angle larger than 45°, a parallel light vertically incident on the incidence plane 15 so that the parallel light passes through the integrated hologram optical device 200, while a combination of the hogels 220 diverges the parallel light. In other words, the lattice plane 210 of the DOE of each hogel 220 may have an angle, with respect to a central axis C, increasing outwardly from the central axis C, and is configured to be towards the outside. Accordingly, the parallel light vertically incident on the incidence plane 15 may be diverged because the incidence angle and the reflection angle of the parallel light outwardly increase.

The integrated hologram optical device 300 of FIG. 5 operates as a concave curved mirror.

Referring to FIG. 5, the integrated hologram optical device 300 includes a 2D array of a plurality of the hogels 320, and may operate as the concave curved mirror with a positive focus. Particularly, a lattice plane 310 of a DOE of each hogel 320 reflects, at a reflection angle smaller than 45°, a parallel light vertically incident on the incidence plane 15 so that the parallel light is reflected by the integrated hologram optical device 300, while a combination of the hogels 320 focuses the parallel light. In other words, the lattice plane 310 of the DOE of each hogel 320 may have an angle with respect to a central axis C, wherein the angle decreases outwardly from the central axis C, and is configured to face the central axis C. Accordingly, the parallel light vertically incident on the incidence plane 15 may be focused on one point by being reflected by the integrated hologram optical device 300 because the incidence angle and the reflection angle of the parallel light outwardly increase.

Figure 6:
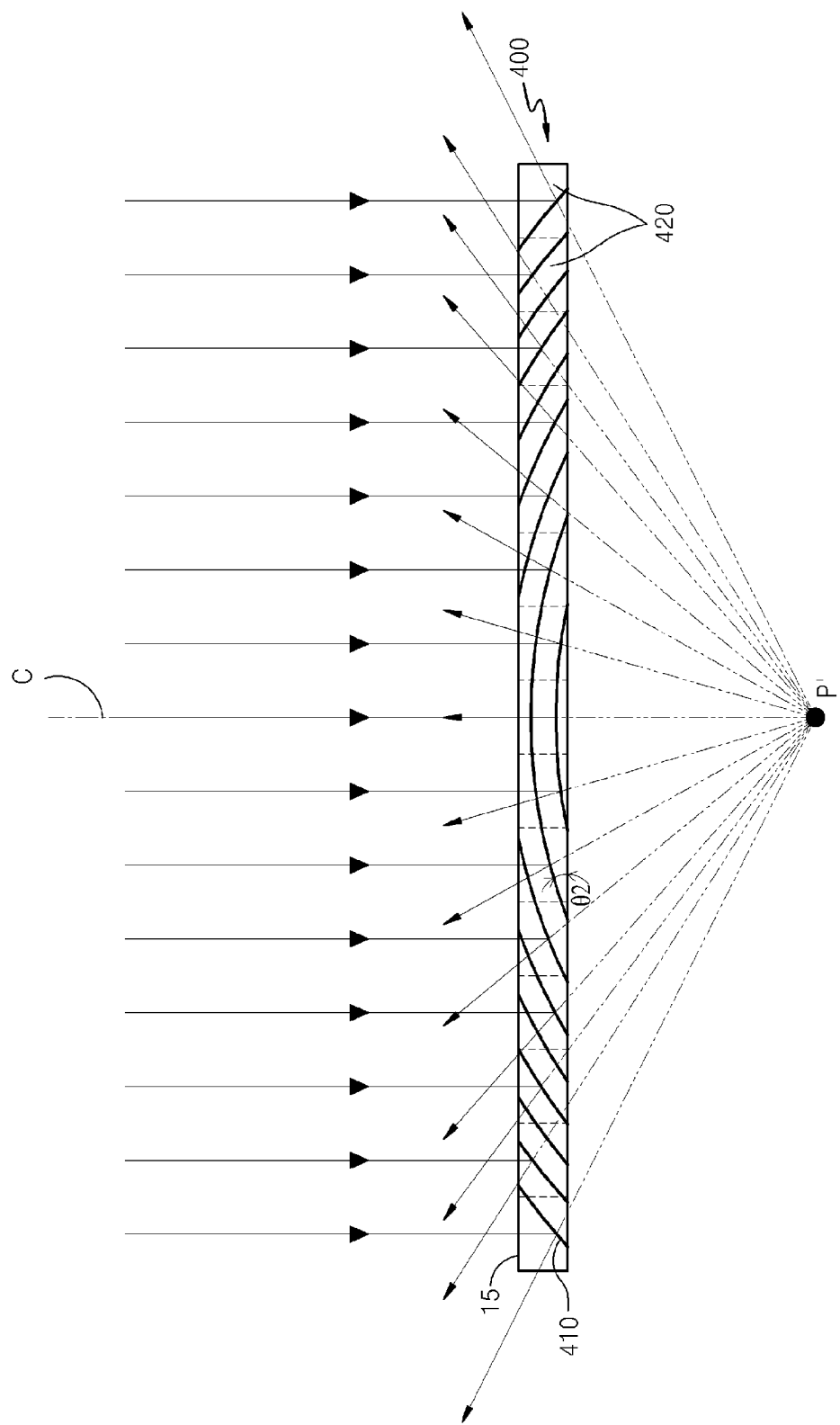

The integrated hologram optical device 400 of FIG. 6 operates as a convex curved mirror.

Referring to FIG. 6, the integrated hologram optical device 400 includes a 2D array of a plurality of the hogels 420, and may operate as a convex curved mirror with a negative focus. Particularly, a lattice plane 410 of a DOE of each hogel 420 reflects, at a reflection angle smaller than 45°, a parallel light vertically incident on the incidence plane 15 so that the parallel light is reflected by the integrated hologram optical device 400, while a combination of the hogels 420 diverges the parallel light. In other words, the lattice plane 410 of the DOE of each hogel 420 may have an angle with respect to a central axis C, wherein the angle decreases outwardly from the central axis C, and is configured to be towards the outside. Accordingly, the parallel light vertically incident on the incidence plane 15 may be diverged because the incidence angle and the reflection angle of the parallel light outwardly increase.

Figure 7:
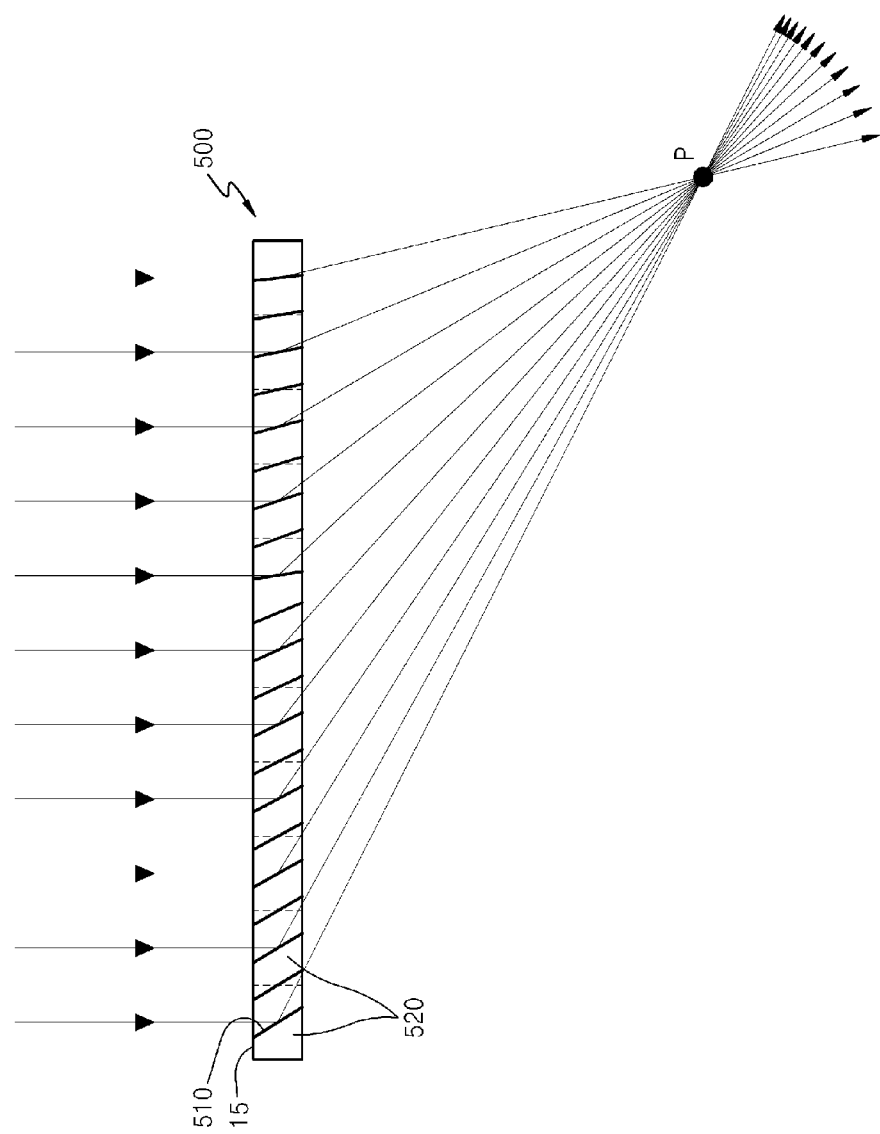
Figure 8:
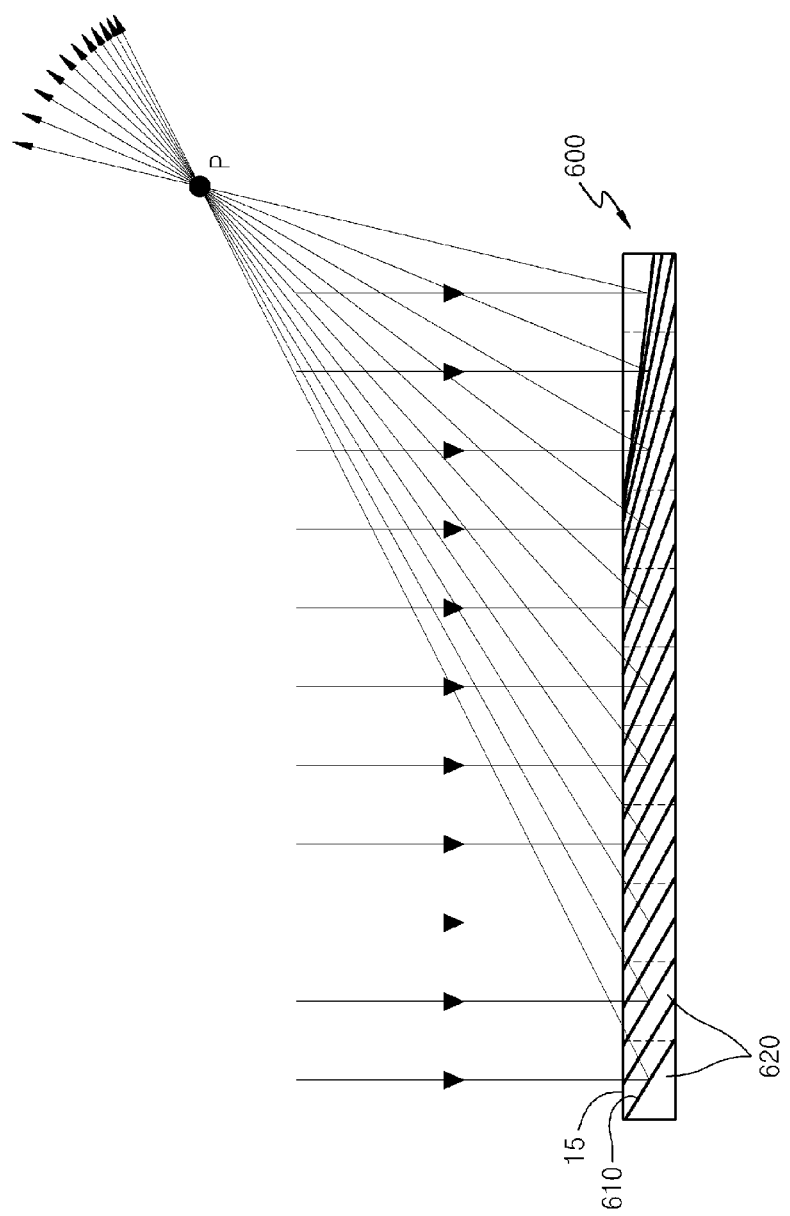

FIGS. 7 and 8 are schematic diagrams of the integrated hologram optical devices 500 and 600 according to other exemplary embodiments, wherein the integrated hologram optical device 500 of FIG. 7 operates as an off-axis lens and the integrated hologram optical device 600 of FIG. 8 operates as an off-axis curved mirror.

Referring to FIG. 7, the integrated hologram optical device 500 includes a 2D array of a plurality of the hogels 520, and may operate as an off-axis focusing lens. Specifically, a lattice plane 510 of a DOE of each hogel 520 reflects, at a reflection angle larger than 45°, a parallel light vertically incident on the incidence plane 15 so that the parallel light passes through the integrated hologram optical device 500, while a combination of the hogels 520 focuses the parallel light on an off-axis. The focal point is shown as P in the figure. In other words, the lattice plane 510 of the DOE of each hogel 520 may have an angle with respect to a predetermined axis increasing away from the predetermined axis, and is configured to face the predetermined axis. Accordingly, the parallel light vertically incident on the incidence plane 15 may be focused on one point of the off-axis because the incidence angle and the reflection angle of the parallel light increase away from the predetermined axis.

Referring to FIG. 8, the integrated hologram optical device 600 includes a 2D array of a plurality of the hogels 620, and may operate as an off-axis curved mirror. Specifically, a lattice plane 610 of a DOE of each hogel 620 reflects, at a reflection angle smaller than 45°, a parallel light vertically incident on the incidence plane 15 so that the parallel light is reflected by the integrated hologram optical device 600, while a combination of the hogels 620 focuses the parallel light on off-axis. In other words, the lattice plane 610 of the DOE of each hogel 620 may have an angle with respect to a predetermined axis, wherein the angle increases outwardly from the predetermined axis, and is configured to face the predetermined axis. Accordingly, the parallel light vertically incident on the incidence plane 15 may be focused on one point of the off-axis by being reflected at the integrated hologram optical device 600 because the incidence angle and the reflection angle of the parallel light increase away from the predetermined axis.

Figure 9:
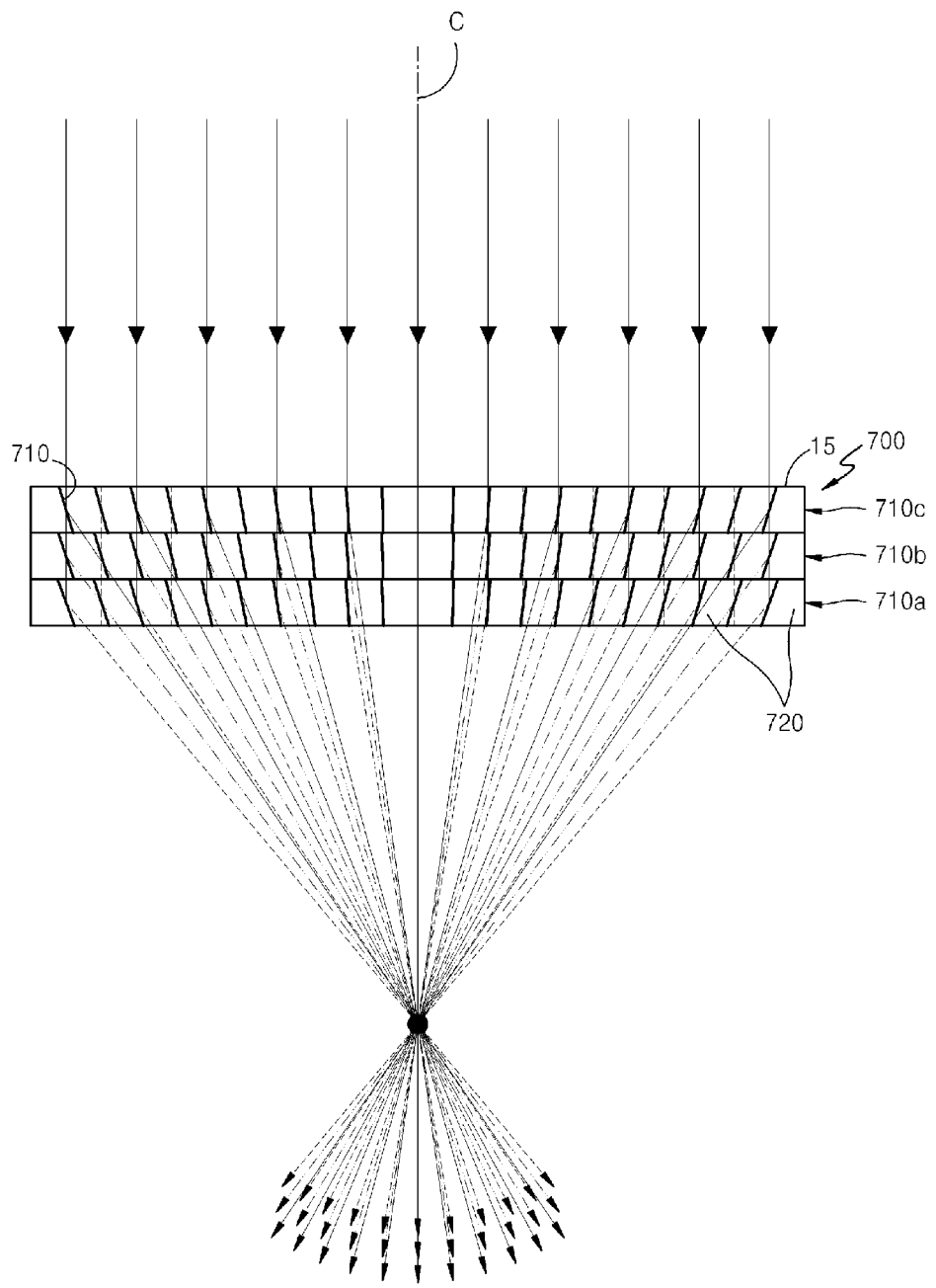

FIG. 9 is a schematic diagram of the integrated hologram optical device 700 according to another embodiment, which operates as a chromatic aberration free lens.

Referring to FIG. 9, the integrated hologram optical device 700 includes layers 710*a*, 710*b*, and 710*c* each including a 2D array of a plurality of hogels 720. Each of the 2D arrays of the plurality of hogels 720 included in layers 710*a*, 710*b*, and 710*c* may operate as a focusing lens with respect to a light having a predetermined wavelength and that is vertically incident on the incidence plane 15. The integrated hologram optical device 700 may operate as a focusing lens, wherein a lattice plane 710 of a DOE of each of the hogels 720 included in the layers 710*a* through 710*c* reflects, at a reflection angle larger than 45°, a parallel light vertically incident on the incidence plane 15 so that the parallel light passes through the integrated hologram optical device 700 while combinations of the hogels 720 respectively in the layers 710*a* through 710*c* focus parallel lights of different wavelengths. In FIG. 9, the integrated hologram optical device 700 includes three layers 710*a* through 710*c*, each including a 2D array of the hogels 720. The hogels 720 included in the layers 710*a* through 710*c* may respectively operate as focusing lenses for red, green, and blue light. At this time, because red, green, and blue light are focused on one point, a chromatic aberration-free focusing lens may be realized.

In order to realize a focusing lens like the integrated hologram optical device 100 of FIG. 3, the lattice plane 710 of a DOE of each hogel 720 in the 2D array of the plurality of hogels formed at each of the layers 710*a*, 710*b* and 710*c* may have an angle increasing outwardly from a central axis C of the integrated hologram optical device 700, and the lattice plane 710 may face the central axis C. Accordingly, the parallel light vertically incident on the incidence plane 15 may be focused on one point because the incidence angle and the reflection angle of the parallel light outwardly increase.

When the integrated hologram optical device 700 includes a plurality of the layers 710*a* through 710*c*, which each include the 2D array of the hogels 720 as shown in FIG. 9, and the 2D arrays are recorded such that the layers 710*a* through 710*c* operate as lenses of lights of different wavelengths, the chromatic aberration-free focusing lens may be realized. The integrated hologram optical device 700 of FIG. 9 includes the three layers 710*a* through 710*c*, but the number of layers is not limited thereto, and it may be 4 or more according to design conditions.

Figure 10:
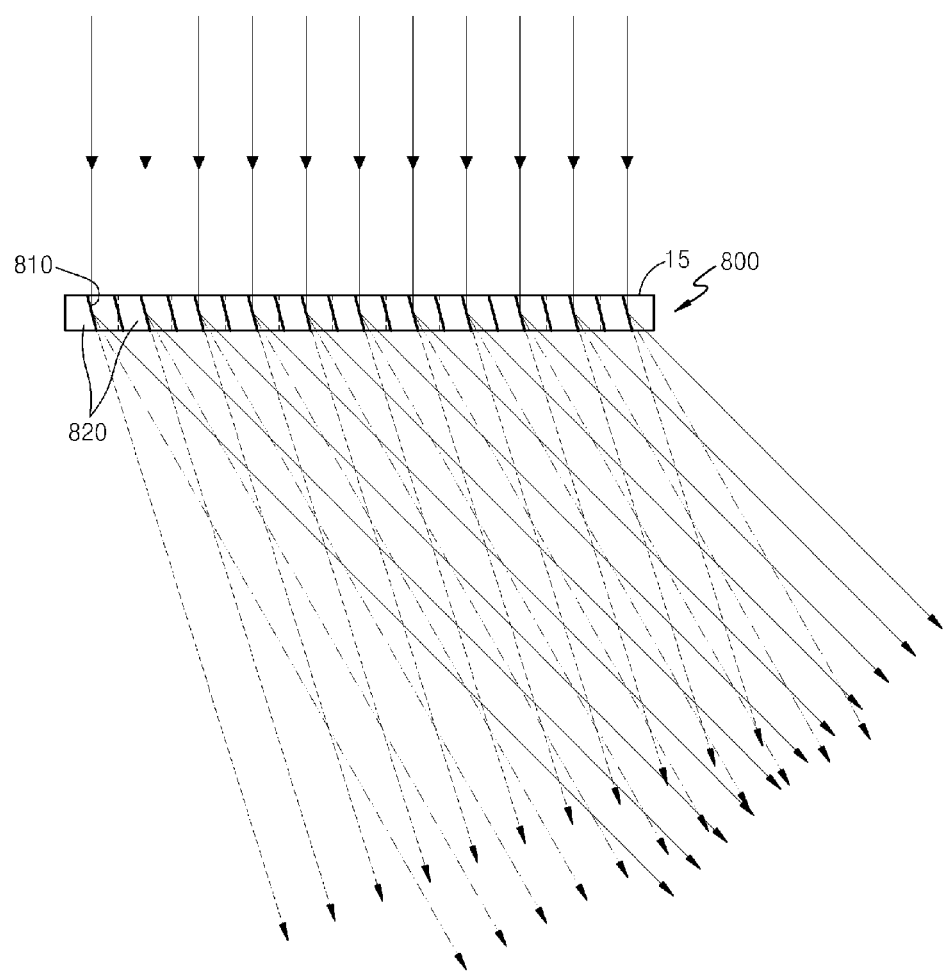
Figure 11:
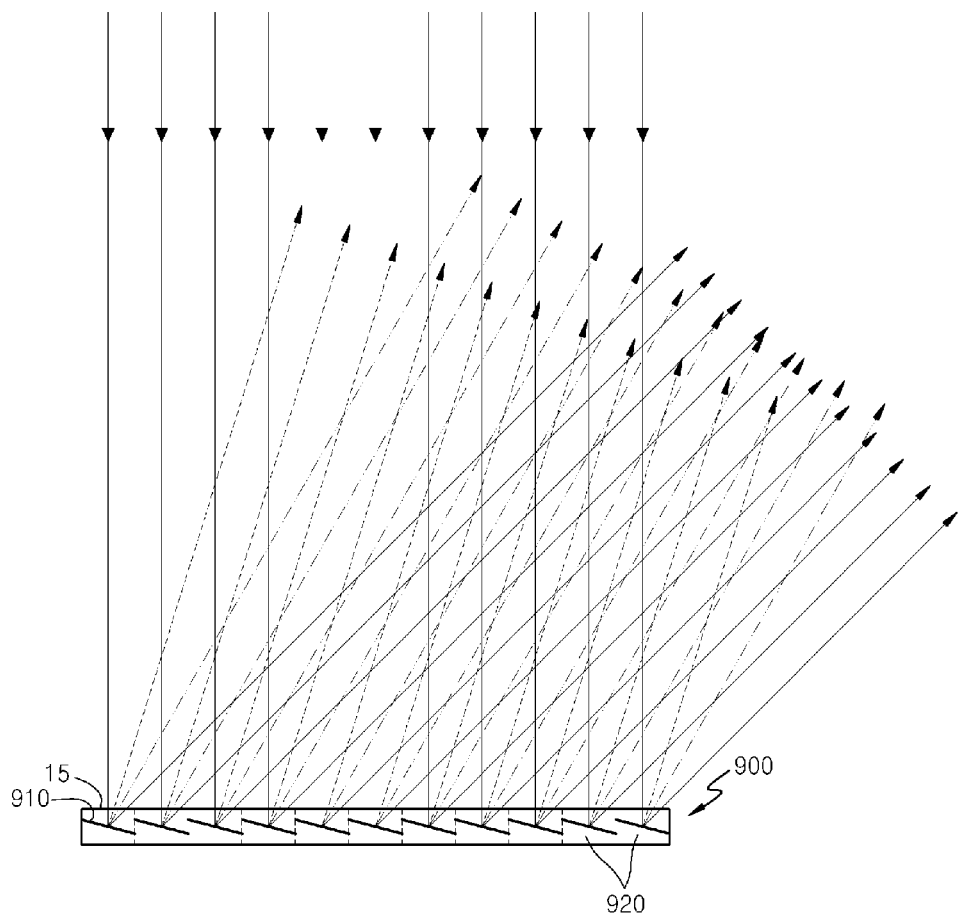

FIGS. 10 and 11 are schematic diagrams of the integrated hologram optical devices 800 and 900 according to other embodiments, wherein the integrated hologram optical device 800 of FIG. 10 operates as a transmission grating and the integrated hologram optical device 900 of FIG. 11 operates as a reflection grating.

Referring to FIG. 10, the integrated hologram optical device 800 includes a 2D array of a plurality of hogels 820, wherein a lattice plane 810 of a DOE of each hogel 820 reflects, at a reflection angle larger than 45°, a parallel light vertically incident on the incidence plane 15 so that the parallel light passes through the integrated hologram optical device 800, while each hogel 820 operates as a grating. Here, gradients of the lattice planes 810 of the hogels 820 may be the same.

Referring to FIG. 11, the integrated hologram optical device 900 includes a 2D array of a plurality of hogels 920, wherein a lattice plane 910 of a DOE of each hogel 920 reflects, at a reflection angle smaller than 45°, a parallel light vertically incident on the incidence plane 15 so that the parallel light is reflected by the integrated hologram optical device 900, while each hogel 920 operates as a grating. Here, gradients of the lattice planes 910 of the hogels 920 may be the same.

As well known to one of ordinary skill in the art, a diffraction angle of a grating may differ according to wavelengths of incident light. Thus, for example, when a white light is incident on the integrated hologram optical device 900, the incident white light may be separated into a red light, a green light, and a blue light.

According to one or more exemplary embodiments, a number density may vary across an integrated hologram optical device. Particularly, the integrated hologram optical device may consist of a 2D array consisting of a plurality of hogels. The number density of a DOE of each hogel may vary thereby providing a variant of diffractive properties across the integrated hologram optical device. The number density may be, for example, at least one of a mass density for well-defined molecular mass materials and a molar concentration. According to an exemplary embodiment, the number density may increase or decrease for the hogels in the array as the hogels' location is closer to a central axis of the integrated hologram optical device. Other density patterns may also be provided according to one or more exemplary embodiments. The density of the plurality of hogels may be done in combination with a variable lattice plane angle variance providing reflective and diffractive property adjustment for each hogel of the array.

According to the integrated hologram optical devices 10 and 100 through 900, the combinations of the hogels 20 and 120 through 920 operate as predetermined optical elements by including the 2D arrays of the plurality of hogels 20 and 120 through 920 and recording holographic element in each hogel while adjusting angles or focal lengths of signal beams.

Figure 12:
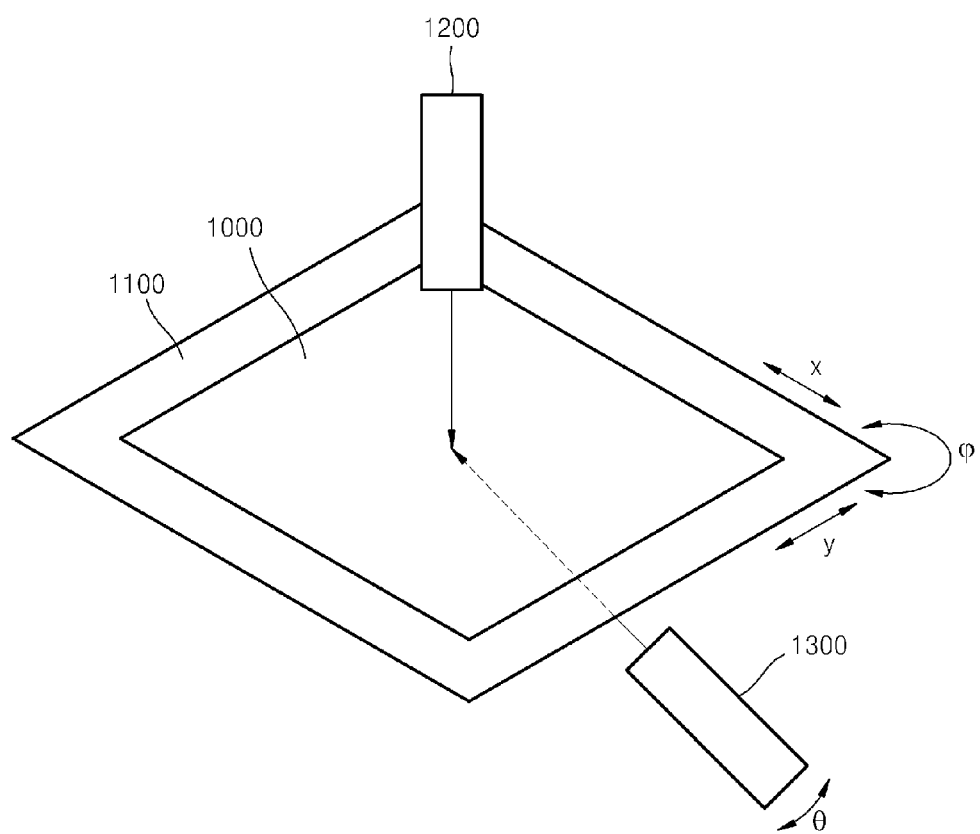
FIG. 12 is a schematic diagram illustrating an integrated hologram recording apparatus usable in manufacturing a reflection integrated hologram optical device according to an exemplary embodiment.
Figure 13:
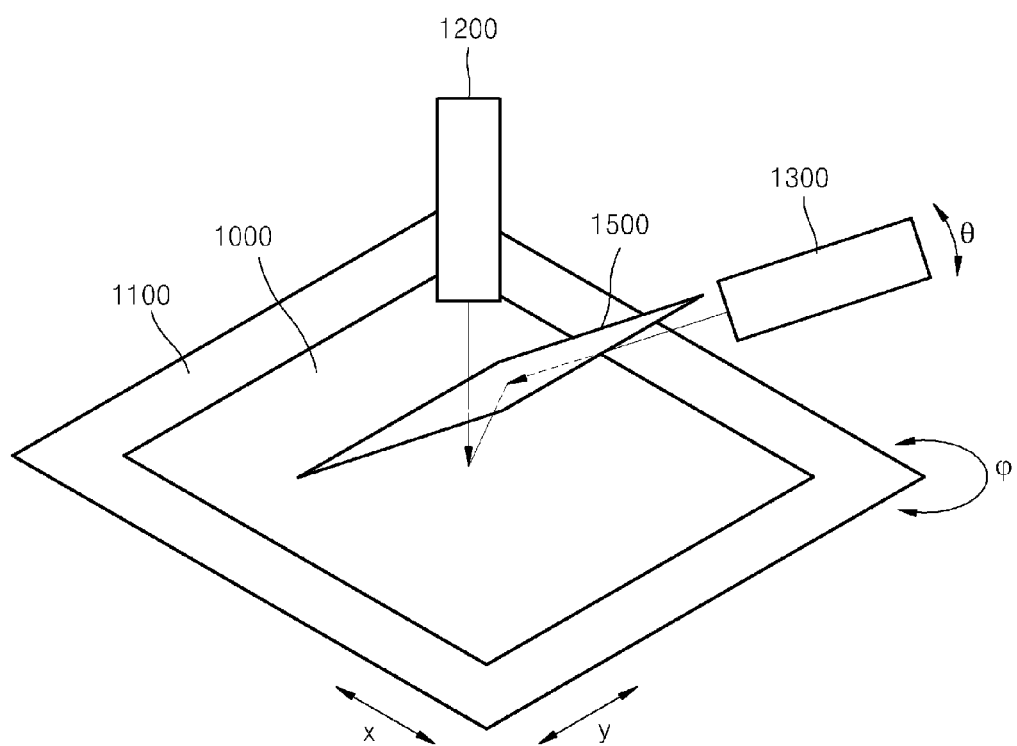
FIG. 13 is a schematic diagram illustrating an integrated hologram recording apparatus usable in manufacturing a transmission integrated hologram optical device according to an exemplary embodiment.

Integrated hologram optical devices recording apparatuses shown in FIGS. 12 and 13 may be used to record the integrated hologram optical devices 10 and 100 through 900 based on the hogels 20 and 120 through 920 described above.

FIGS. 12 and 13 are schematic diagrams of integrated hologram recording apparatuses usable in manufacturing an integrated hologram optical device, according to exemplary embodiments, wherein the integrated hologram recording apparatus of FIG. 12 may record a reflection integrated hologram and the integrated hologram recording apparatus of FIG. 13 may record a transmission integrated hologram.

Referring to FIGS. 12 and 13, the integrated hologram recording apparatus includes a stage 1100 on which a holographic film, i.e., a hologram recording medium 1000, is placed, a reference beam irradiator 1200 irradiating a reference beam on the hologram recording medium 1000, and a signal beam irradiator 1300 irradiating a signal beam on the hologram recording medium 1000 to cross the reference beam.

The stage 1100 supports the hologram recording medium 1000 to be movable in x- and y-directions and to be angular-rotatable, so as to form a 2D array of a plurality of hogels, wherein a combination of the hogels operates as an optical element, as a holographic element is recorded on the hologram recording medium 1000 in a hogel unit. In other words, the stage 1100 is prepared to be movable in the x- and y-directions and angular-rotatable. The rotation angle is shown as φ in FIG. 12.

The reference beam irradiator 1200 irradiates the reference beam, which is a collimated parallel beam, on the hologram recording medium 1000.

The signal beam irradiator 1300 may arbitrarily adjust a focal length of the signal beam and may adjust a curvature of the signal beam. The change of the curvature of the signal beam is shown as θ in FIGS. 112 and 13.

In FIG. 12, the reference beam irradiator 1200 and the signal beam irradiator 1300 are arranged to generate an interference pattern by respectively irradiating the reference beam and the signal beam so that the two beams cross each other through opposite planes of the hologram recording medium 1000, thereby recording a reflection integrated hologram on the hologram recording medium 1000.

In FIG. 13, the reference beam irradiator 1200 and the signal beam irradiator 1300 are arranged to generate an interference pattern by respectively irradiating the reference beam and the signal beam so that the two beams cross each other through the same plane of the hologram recording medium 1000, thereby recording a transmission integrated hologram on the hologram recording medium 1000. A reference numeral 1500 of FIG. 13 denotes an optical path changer, such as a beam splitter. The optical path changer 1500 may allow the reference beam to pass through and reflect the signal beam so that the reference beam and the signal beam are irradiated on the hologram recording medium 1000 while crossing each other. Here, the reference beam irradiator 1200 and the signal beam irradiator 1300 may be arranged such that the reference beam and the signal beam cross each other on the same plane of the hologram recording medium 1000 as the reference beam is reflected by the optical path changer 1500 and the signal beam transmits through the optical path changer 1500.

According to the integrated hologram recording apparatuses of FIGS. 12 and 13, the reference beam is incident on the hologram recording medium 1000 after being collimated to a parallel light. The signal beam irradiator 1300 may use a device, such as a telescope capable of arbitrarily adjusting a focal length, to adjust a curvature of a diffracted signal beam.

A holographic element of each hogel is recorded on the hologram recording medium 1000 while adjusting an angle or focal length of a signal beam, by using such integrated hologram recording apparatuses, and a 2D array of a plurality of hogels may be formed such that a combination of the hogels operates as an optical element.

In other words, the holographic element is recorded in a hogel unit on the hologram recording medium 1000 placed on the stage 1100 by irradiating the reference beam to the hologram recording medium 1000 and irradiating the signal beam to cross the reference beam, and when the signal beam is irradiated to cross the reference beam by moving and angular-rotating the stage 1100 in the x- and y-directions while adjusting a focal length and curvature of the signal beam, the 2D array of the hogels may be formed such that the combination of the hogels operates as an optical element.

Here, as shown in FIG. 12, when the reference beam and the signal beam are irradiated to cross each other through opposite planes of the hologram recording medium 1000, the integrated hologram optical devices 300, 400, 600, and 900 of FIGS. 5, 6, 8, and 11, operating as reflection diffraction optical devices, may be manufactured.

Alternatively, when the reference beam and the signal beam are irradiated to cross each other through the same plane of the hologram recording medium 1000 as shown in FIG. 13, the integrated hologram optical devices 100, 200, 500, 700, and 800 of FIGS. 3, 4, 7, 9, and 10 operating as transmission diffraction optical devices may be manufactured.

According to the integrated hologram optical device, the method of manufacturing the same, and the integrated hologram recording apparatus described above, an entire holographic element may be formed via a combination of a plurality of hogels, and a thickness of an optical element may be reduced by a thickness of a hologram recording medium, i.e., a holographic film, in an optical axis direction, and thus an optical lens or a curved mirror may be miniaturized. In other words, a volume occupied by general optical elements may be reduced by the thickness of the holographic film in the optical axis direction, and thus a space may be obtained. In addition, an ultra-high numerical aperture may be realized, and a holographic element may be arbitrarily designed without having to use an optical element as a model. When a hogel is recorded, a numerical aperture of a lens or mirror of an entire integrated hologram optical device may be adjusted by adjusting an angle or focal length of a signal beam. While recording a hogel, diffraction efficiency according to coordinates may be arbitrarily adjusted so as to adjust intensity profile of light transmitting through (or reflected by) the lens of the integrated hologram optical device, i.e., a holographic lens. Thus, not only functions of the lens, but also functions of a profile mask, may be simultaneously performed. The lens may be designed to reduce or remove a spherical aberration of a general lens, and a beam profile improved on focus may be obtained by improving resolution of a hogel. Also, by using a multi-layer RGB integrated hologram optical device, a panchromatic integrated hologram optical device may be manufactured.

As described above, according to the integrated hologram optical device, the method of manufacturing the same, and the integrated hologram recording apparatus of one or more of the above exemplary embodiments, an integrated hologram optical device may be arbitrarily realized without being limited to design limitations of an optical element used for holographic recording, because an entire holographic element is integrated and recorded in a hogel unit.

It should be understood that the exemplary embodiments described therein should be considered in a descriptive sense only and not for purposes of limitation. Descriptions of features or aspects within each embodiment should typically be considered as available for other similar features or aspects in other embodiments. Particularly, while exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An integrated hologram optical device comprising:
   a two-dimensional (2D) array of a plurality of hogels,
   wherein a holographic element is configured to be recorded on each of the plurality of hogels of the array by adjusting at least one of an angle and a focal length of a signal beam such that a combination of the plurality of hogels of the array operates as an optical element,
   wherein a lattice plane of each of the plurality of hogels forms an angle with respect to a central axis of the integrated hologram optical device,
   wherein the angle increases outwardly from the central axis such that the lattice plane of the plurality of hogels farther from the central axis form angles larger than the angles of the lattice plane of the plurality of hogels closer to the central axis,
   wherein a reflective surface of the lattice plane of each of the plurality of hogels faces the central axis, and
   wherein the lattice plane is a holographic grating plane on which an interference of the signal beam and a reference beam occurs during the recording.

2. The integrated hologram optical device of claim 1, wherein the lattice plane of each of the plurality of hogels is formed to have an angle larger than 45° with respect to an incident surface of the integrated hologram optical device.

3. The integrated hologram optical device of claim 2, wherein each of the plurality of hogels is configured such that the integrated hologram optical device operates as a lens, such that a parallel light vertically incident on the incident surface is reflected at an angle larger than 45°.

4. The integrated hologram optical device of claim 2, wherein each of the plurality of hogels is configured such that the combination of the plurality of hogels operates as an off-axis focusing lens.

5. The integrated hologram optical device of claim 2, comprising:
   a plurality of layers, each of the plurality of layers comprising the 2D array of the plurality of hogels,
   wherein the 2D array of the plurality of hogels comprised in each of the plurality of the layers is configured to operate as a focusing lens with respect to a light having a predetermined wavelength so as to operate as a chromatic aberration-free lens.

6. The integrated hologram optical device of claim 2, wherein each of the plurality of hogels is configured such that the combination of the plurality of hogels operates as a transmission grating.

7. The integrated hologram optical device of claim 1, wherein a lattice plane of each of the plurality of hogels comprise an angle smaller than 45° with respect to an incident surface of the integrated hologram optical device.

8. The integrated hologram optical device of claim 7, wherein each of the plurality of hogels is configured such that the integrated hologram optical device operates as a curved mirror, such that parallel light vertically incident on the incident surface is reflected at the integrated hologram optical device at an angle smaller than 45°.

9. The integrated hologram optical device of claim 7, wherein each of the plurality of hogels is configured such that the combination of the plurality of hogels operates as an off-axis curved mirror.

10. The integrated hologram optical device of claim 7, wherein each of the plurality of hogels is configured such that the combination of the plurality of hogels operates as a reflection grating.

11. A hologram apparatus comprising:
    an integrated hologram optical device comprising a plurality of hogels arranged in an array along an incident surface,
    wherein each of the plurality of hogels comprises a lattice plane and a number density,
    wherein the lattice plane of at least one hogel of the plurality of hogels is non-planar,
    wherein the number density of each of the plurality of hogel varies from adjacent hogels, and
    wherein the lattice plane is a holographic grating plane on which an interference of a signal beam and a reference beam occurs during recording of the plurality of hogels.

12. The hologram apparatus of claim 11, wherein an angle of each lattice plane of the plurality of hogels is greater than 45 degrees from the incident surface of the array.

13. The hologram apparatus of claim 11,
wherein an angle of each lattice plane of the plurality of hogels is less than 45 degrees from the incident surface of the array.

14. The hologram apparatus of claim 11,
wherein the number density is at least one of a mass density for well-defined molecular mass materials and a molar concentration.

\* \* \* \* \*